(12) United States Patent
Fok et al.

(10) Patent No.: US 10,587,938 B2
(45) Date of Patent: Mar. 10, 2020

(54) ULTRA HIGH-SPEED PHOTONICS BASED RADIO FREQUENCY SWITCHING

(71) Applicant: University of Georgia Research Foundation, Inc., Athens, GA (US)

(72) Inventors: Mable P. Fok, Bishop, GA (US); Jia Ge, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 208 days.

(21) Appl. No.: 15/553,705

(22) PCT Filed: Feb. 26, 2016

(86) PCT No.: PCT/US2016/019770
§ 371 (c)(1),
(2) Date: Aug. 25, 2017

(87) PCT Pub. No.: WO2016/138379
PCT Pub. Date: Sep. 1, 2016

(65) Prior Publication Data
US 2018/0027314 A1     Jan. 25, 2018

Related U.S. Application Data

(60) Provisional application No. 62/121,951, filed on Feb. 27, 2015.

(51) Int. Cl.
*H04Q 11/00* (2006.01)
*G02B 6/293* (2006.01)
*H04B 10/294* (2013.01)

(52) U.S. Cl.
CPC ....... *H04Q 11/0005* (2013.01); *G02B 6/2938* (2013.01); *G02B 6/29389* (2013.01); *H04B 10/2941* (2013.01); *H04B 2210/006* (2013.01)

(58) Field of Classification Search
CPC combination set(s) only.
See application file for complete search history.

(56) References Cited

U.S. PATENT DOCUMENTS 3,852,794 A * 12/1974 Pearson ................. H01L 47/02
257/6
6,399,934 B1 * 6/2002 Sullivan ................. H01J 3/024
250/214 R (Continued)

OTHER PUBLICATIONS

International Search Report for PCT/US2016/019770 dated May 6, 2016.

(Continued)

*Primary Examiner* — Omar S Ismail
(74) *Attorney, Agent, or Firm* — Thomas Horstemeyer, LLP

(57) ABSTRACT

Various examples are provided for radio frequency (RF) switching. In one example, a RF switch includes a dual-drive Mach-Zehnder modulator (DDMZM) that can generate a single-sideband (SSB) signal by modulating an input RF signal onto an optical carrier; a tunable phase modulator incorporated loop mirror filter (PM-LMF) that can optically notch filter the SSB signal in response to a control signal; and a photodetector (PD) that can generate a RF output signal based upon the SSB signal. In another example, a method includes modulating an input RF signal onto an optical carrier to generate a SSB signal; notch filtering the SSB signal by a tunable PM-LMF in response to a control signal; and generating a RF output signal based upon the SSB signal.

20 Claims, 5 Drawing Sheets

(56) References Cited

U.S. PATENT DOCUMENTS

| | | | | |
|---|---|---|---|---|
| 6,661,976 B1* | 12/2003 | Gnauck | ............... | H04B 10/505 |
| | | | | 375/301 |
| 2002/0037135 A1* | 3/2002 | Atieh | .................... | G01M 11/00 |
| | | | | 385/37 |
| 2002/0071152 A1* | 6/2002 | Blumenthal | ........ | H04J 14/0298 |
| | | | | 398/43 |
| 2005/0129344 A1* | 6/2005 | Ishizuka | .............. | G02B 6/3588 |
| | | | | 385/4 |
| 2010/0014874 A1* | 1/2010 | Kawanishi | .............. | G02F 1/225 |
| | | | | 398/187 |
| 2013/0202305 A1* | 8/2013 | Zhou | ....................... | G01S 7/282 |
| | | | | 398/115 |
| 2013/0315590 A1* | 11/2013 | Zhou | .................. | H04Q 11/0003 |
| | | | | 398/48 |
| 2014/0028368 A1 | 1/2014 | Khlat | | |

OTHER PUBLICATIONS

Jiang, et al., "A Selectable Multiband Bandpass Microwave Photonic Filter", IEEE Photonics Journal, vol. 5, No. 3, Jun. 2013, 9 pages.

Chen, et al., "Switchable and tunable microwave frequency multiplication based on a dual-passband microwave photonic filter", Optics Express 9835, Published Apr. 9, 2015, vol. 23, No. 8, 9 pages.

Supradeepa, et al., "Comb-based radiofrequency photonic filters with rapid tunability and high selectivity", Nature Photonics, vol. 6, Mar. 2012, pp. 186-194.

* cited by examiner

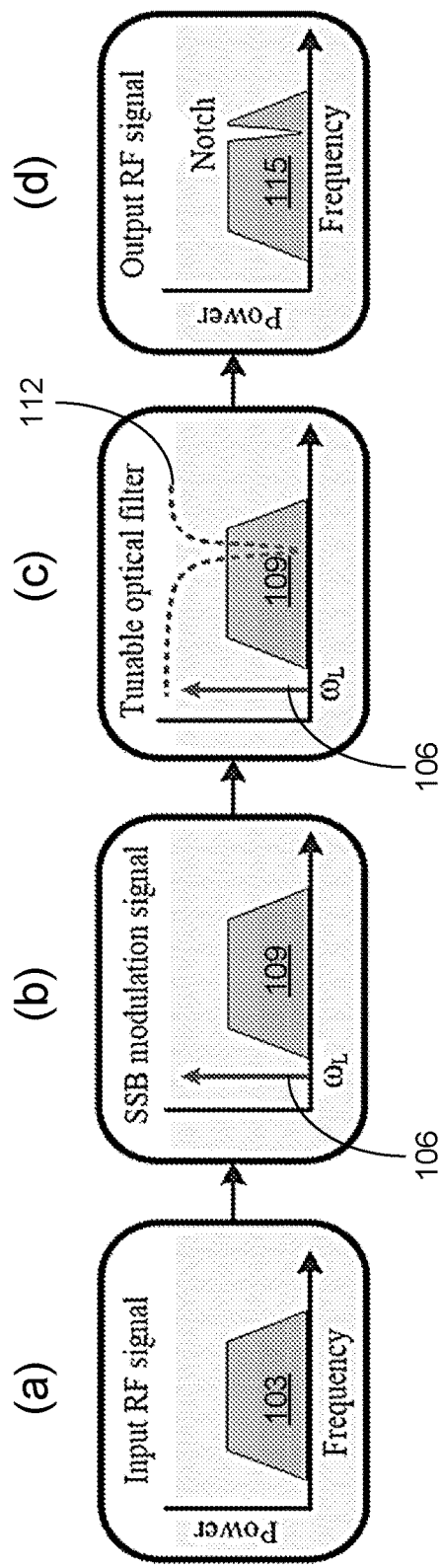
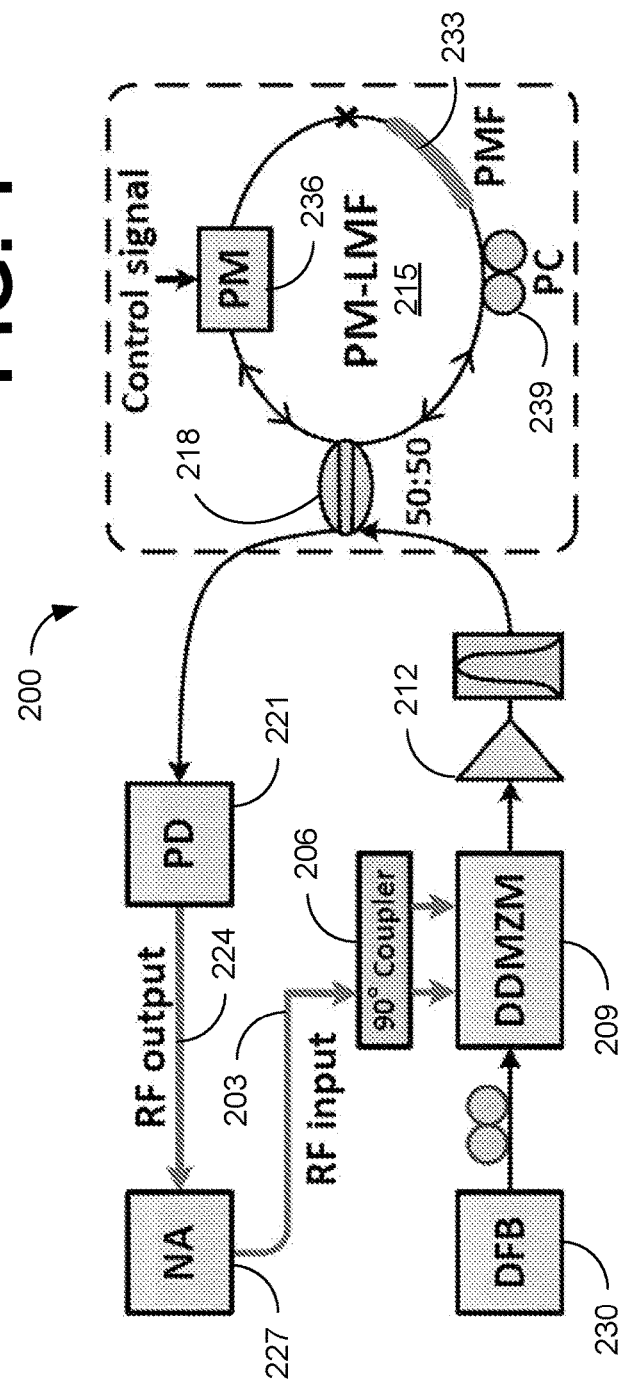
FIG. 1
FIG. 2

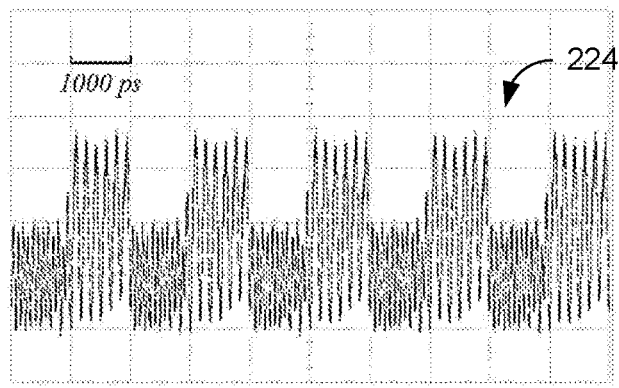
FIG. 7A
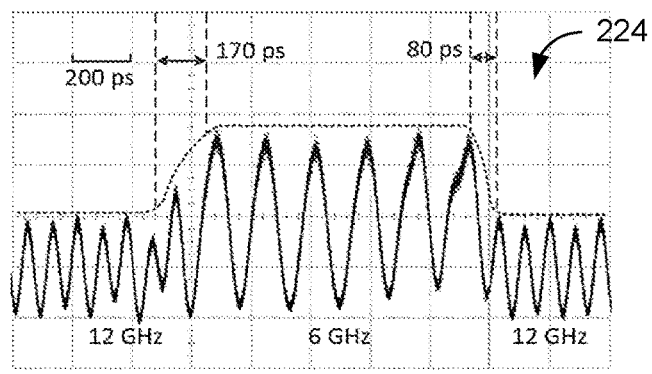
FIG. 7B
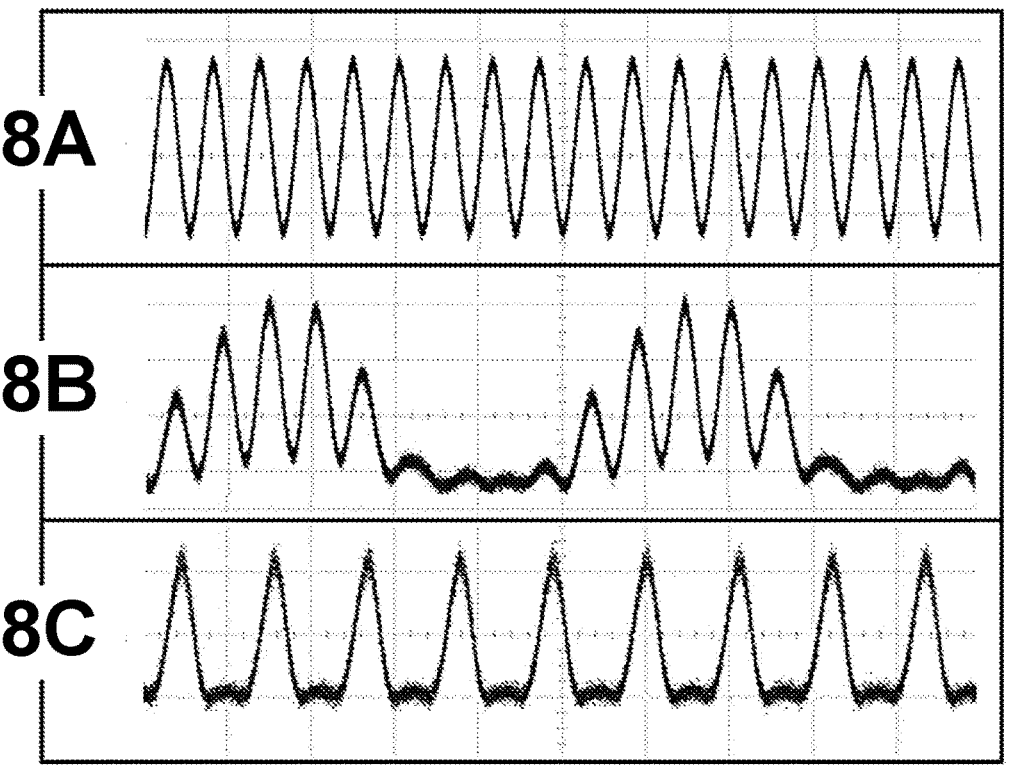
200 ps/division

ULTRA HIGH-SPEED PHOTONICS BASED RADIO FREQUENCY SWITCHING

CROSS REFERENCE TO RELATED APPLICATIONS

This application is the 35 U.S.C. § 371 national stage application of PCT Application No. PCT/US2016/019770, filed Feb. 26, 2016, which claims priority to, and the benefit of, U.S. provisional application entitled "ULTRA HIGH-SPEED PHOTONICS BASED RADIO FREQUENCY SWITCH" having Ser. No. 62/121,951, filed Feb. 27, 2015, both of which are herein incorporated by reference in their entireties

STATEMENT REGARDING FEDERALLY SPONSORED RESEARCH OR DEVELOPMENT

This invention was made with government support under agreement CNS 1217435 awarded by the National Science Foundation. The Government has certain rights in the invention.

BACKGROUND

A radio frequency (RF) switch, also called a microwave switch, is a device that can be used to route high frequency signals between different transmission channels. RF switches have been intensively used in microwave systems, such as wireless communication systems, radar systems, satellite communication systems, broadband wireless networks, and microwave test systems for signal routing.

SUMMARY

Embodiments of the present disclosure are related to radio frequency (RF) switching. The RF switching can be based on ultra high-speed photonics.

In one embodiment, among others, a radio frequency (RF) switch comprises a dual-drive Mach-Zehnder modulator (DDMZM) configured to generate a single-sideband (SSB) signal by modulating an input RF signal onto an optical carrier; a tunable phase modulator incorporated loop mirror filter (PM-LMF) configured to optically notch filter the SSB signal in response to a control signal; and a photodetector (PD) configured to generate a RF output signal based upon the SSB signal. The control signal can comprise a switching period that is less than a nanosecond and/or a rise-time/fall-time of about 100 picoseconds or less. A switching speed of the RF switch can be less than 200 picoseconds or can be less than 100 picoseconds.

In one or more aspects of these embodiments, the input RF signal can comprises a signal at a predefined frequency. The tunable PM-LMF can be configured to turn on or off the signal at the predefined frequency in response to the control signal. The tunable PM-LMF can turn on or off the signal at the predefined frequency based upon a voltage level of the control signal. The input RF signal can comprise a first signal at a first predefined frequency and a second signal at a second predefined frequency. The tunable PM-LMF can be configured to switch between the first signal and the second signal in response to the control signal. The tunable PM-LMF can switch between the first signal and the second signal based upon a voltage level of the control signal.

In one or more aspects of these embodiments, the SSB signal can be launched into the tunable PM-LMF via an optical coupler. An optical amplifier can be configured to amplify the SSB signal prior to launching into the tunable PM-LMF. The PM-LMF can comprise a polarization maintaining fiber (PMF), a polarization controller (PC), and/or a phase modulator (PM) configured to control operation of the PM-LMF based upon the control signal. Switching of the PM-LMF can be based upon a Pockels electro-optic effect produced in the PM in response to the control signal. The input RF signal can be modulated onto the optical carrier by the DDMZM via a 90-degree hybrid coupler.

In another embodiment, a method comprises modulating an input radio frequency (RF) signal onto an optical carrier to generate a single-sideband (SSB) signal; notch filtering the SSB signal by a tunable PM-LMF in response to a control signal; and generating a RF output signal based upon the SSB signal. The PM-LMF can switch between notch filtering at a first frequency and notch filtering at a second frequency in response to the control signal. The PM-LMF can switch the RF output signal between the first frequency and the second frequency in response to the control signal.

In one or more aspects of these embodiments, the input RF signal can comprise a signal at the first frequency and no signal at the second frequency. The notch filtering of the SSB signal can be based upon birefringence in a phase modulator (PM) of the PM-LMF and/or a PMF. Tuning of the notch filtering can be based upon an electro-optic Pockels effect produced in the PM in response to the control signal. The control signal can comprise a switching period that is less than a nanosecond and/or a rise-time/fall-time of about 100 picoseconds or less.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a graphical representation illustrating operation of tunable microwave photonic (MWP) notch filtering in accordance with various embodiments of the present disclosure.

FIG. 2 is a schematic diagram of an example of a MWP notch filter in accordance with various embodiments of the present disclosure.

FIGS. 7A and 7B are plots illustrating measured two-channel switching performance of the MWP switch in accordance with various embodiments of the present disclosure.

FIGS. 8A through 8C are plots illustrating tuning speed measurement of the MWP notch filter of FIG. 2 in accordance with various embodiments of the present disclosure.

DETAILED DESCRIPTION

Figure 3:
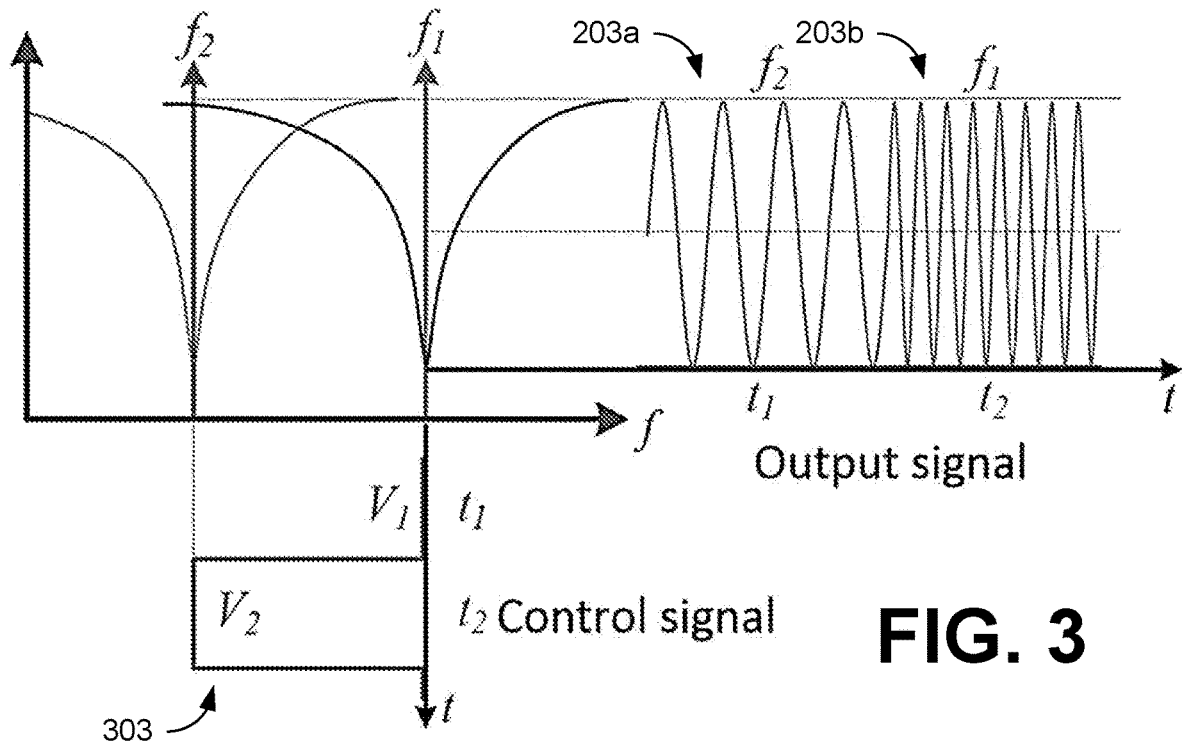
FIG. 3 is a schematic representation illustrating operation of a high-speed MWP radio frequency (RF) switch in accordance with various embodiments of the present disclosure.

Disclosed herein are various examples related to radio frequency (RF) switching. Reference will now be made in detail to the description of the embodiments as illustrated in the drawings, wherein like reference numbers indicate like parts throughout the several views.

Switching speed of a RF switch is a parameter that can be used to define a RF switch, and which is defined as the time needed to change the state of the RF switch from ON to OFF or from OFF to ON. The shorter the switching speed, the faster the RF switch can be operated. In conventional electrical RF switches, the switching speed may be limited to microsecond ($10^{-6}$) range for both electromechanical switches and micro-electromechanical systems (MEMS) switches, while solid state switches can achieve switching speeds of tens of nano-seconds ($10^{-9}$). The switching speed is generally limited by the physical properties of the material and switching mechanism of the RF switch. Examples of switching speeds for different types of RF switches are shown in TABLE 1.

TABLE 1

| RF Switches | Switching speed |
| --- | --- |
| Electromechanical switch | micro-speed ($10^{-6}$) |
| Solid Sate switch | 10 s of nano-second ($10^{-9}$) |
| MEMS Switch | micro-second ($10^{-6}$) |
| Proposed MWP RF switch | <100 s of pico-second ($10^{-12}$) |

Photonics technology is high-speed, broadband, low loss, and electro-magnetically immune, and may be used to break the bottlenecks of various fields, especially in the area of microwaves. By taking advantage of the unique properties from photonics, the performance and capabilities of microwave components and microwave systems may be significantly enhanced. However, MWP RF switches have not been studied since there is no direct way to mimic an electronic RF switch with photonics. One promising way to build a MWP RF switch is by means of a tunable MWP notch filter, which can be rapidly tuned to block an unwanted signal while allowing a desired one to pass through, essentially switching out only the desired signal. Switching speed of the MWP RF switch is governed by the tuning speed of the MWP filter.

High-speed frequency tuning of a notch filter is advantageous in dynamic RF systems where the frequency of the unwanted signal varies over time or the unwanted signal frequency is not known a priori. Unfortunately, a RF notch filter with fast frequency tunability is difficult to achieve using conventional electrical techniques. MWP techniques can be used to significantly enhance the capability of RF filters. Tunable MWP notch filters may be implemented via multi-tap filters or optical sideband spectrum filtering. Other tuning approaches may be based on the use of micro-ring heaters, stimulated Brillouin scattering, tunable delay lines, mechanical tuning, tap wavelength tuning, and MWP phase shifting. However, these approaches suffer from limitations such as limited tuning and operating ranges, high optical operation power requirements, and/or undesired free spectral range and bandwidth change during frequency tuning. Moreover, most of these tuning mechanisms either require a complex tuning mechanism, or are based on thermal or mechanical tuning, which can result in a slow tuning speed below the kHz range.

Examples of an ultra high-speed photonics based RF switch are disclosed where the switching speed relies solely on the ultra-fast electro-optics Pockels effect. The RF switch is based on the transformation of a RF signal into the optical domain and utilizes Pockels effect to perform the switching, which is an interdisciplinary MWP approach. The MWP RF switch (or MWP switch) can exhibit a significantly improved switching speed in the tens of pico-seconds ($10^{-12}$) range, which is 1000 times faster than many conventional RF switches. A switching speed in this range is the highest switching speed that has been demonstrated so far.

The MWP RF switch can work as an ON/OFF switch that can turn the input RF signal ON and OFF. In addition, the MWP RF switch can serve as a two-channel switch that switches two input RF signals with different frequencies in turn to the output. The high speed switching can be achieved by means of a rapidly tunable MWP notch filter based on Pockels effect, to block the unwanted frequency and to pass the desired one. The MWP notch filter can have a bandstop rejection ratio of over 50 dB and the notch frequency can be continuously and rapidly tuned. Since the frequency tuning is based on electro-optics Pockels effect in a phase modulator, the MWP RF switch can be switched at a rate of tens of gigahertz (e.g., with the use of a commercially available 40-GHz phase modulator), resulting in a switching speed of less than 100 pico-seconds. The MWP RF switch is capable of switching between any frequencies that are within the modulation bandwidth of the phase modulator (e.g., tens of GHz).

A continuously tunable MWP notch filter with fast tunability and simple tuning mechanism is desirable in a dynamic RF environment. A MWP notch filter with tens of GHz frequency tuning speed and a simple tuning mechanism can be achieved based on birefringence tuning in a phase modulator of a PM-LMF. This enables rapid and wide range sideband spectral filtering and results in a high-speed tunable MWP notch filter. Birefringence tuning of the phase modulator is based on electro-optic Pockels effect. As a result, the frequency tuning speed can go up to tens of GHz, which is governed by the modulation bandwidth of the phase modulator. A high notch rejection ratio of over 50 dB can be obtained experimentally over a continuous tuning range from about 1.5-GHz to about 10-GHz. Both the filter shape and rejection ratio can be well maintained throughout the entire tuning process. Moreover, the tuning mechanism is simple by solely relying on the driving signal (control signal) of the phase modulator for continuous notch frequency tuning.

Referring to FIG. 1, shown is a graphical representation illustrating the use of the tunable MWP notch filter. FIG.

1(a) illustrates the frequency spectrum of the input RF signal 103. The input RF signal 103 is first converted to optical domain by modulating the RF signal 103 onto an optical carrier 106 through single-sideband (SSB) modulation in an electro-optic intensity modulator, as shown in FIG. 1(b). In the example of FIG. 1(b), the optical carrier 106 is at about 193.4 THz (corresponding to a wavelength of about 1550 nm), while the SSB signal 109 represents the RF signal 103. A tunable optical notch filter 112 is used to manipulate the spectrum such that the unwanted spectral components in the SSB signal 109 are removed from the optical spectrum, as shown in FIG. 1(c). The resultant RF signal 115 is obtained through signal beating between the optical carrier 106 and the spectrally manipulated SSB signal 109 at the photodetector. As shown in FIG. 1(d), notch filtering of the input RF signal 103 is achieved.

Principle of the MWP notch filter, which is a basic component of the MWP RF switch, will first be introduced. Then, how the MWP notch filter is used to implement a high-speed tunable MWP RF switch will be explained. Experimental results of both the MWP notch filter and MWP RF switch are presented.

Tunable microwave photonic (MWP) notch filter

Referring to FIG. 2, shown is a schematic representation of an example of a MWP notch filter 200. An input RF signal 203 can be modulated onto an optical carrier through a 90-degree hybrid coupler 206 together with a dual-drive Mach-Zehnder modulator (DDMZM) 209 (e.g., a 12-GHz DDMZM). A single-sideband (SSB) modulated signal is generated by properly adjusting the biases of the upper and lower branches of the DDMZM 209. The generated SSB signal is then amplified 212 and launched into a phase modulator based loop mirror filter (PM-LMF) 215 in the dashed box through an optical coupler 218 (e.g., a 3-dB optical coupler) for spectrum filtering, such that a certain portion of the microwave signal is chopped out by the optical filter. The undesired portion of the RF signal 203 is removed in the optical domain. The filtered signal is then detected by a photodetector (PD) 221 and converted back to an electrical RF output signal 224. An electrical network analyzer (NA) 227 can be used to measure the filter profile of the MWP notch filter 200. For experimental testing, the NA 227 was used to generate the input RF signal 203. A distributed feedback (DFB) laser 230 can be used to provide the optical carrier.

The proposed PM-LMF 215 works as a spectrum filtering device to remove unwanted frequency components from the input RF signal 203 in its optical domain, which can provide a fast and wide tunability in various applications. As illustrated in FIG. 2, the PM-LMF 215 comprises the optical coupler 218, a piece of polarization maintaining fiber (PMF) 233, a phase modulator (PM) 236, and a polarization controller (PC) 239. Its transmission function can be described by the following equation, $$T(\lambda) = \frac{1}{2}[1 - \cos(\varphi(\lambda))] \quad (1)$$

where $\varphi(\lambda)$ depicts the phase difference between the two counter-propagating beams in the PM-LMF 215. The total phase difference is the accumulated phase difference by both the PM 236 and PMF 233 governed by the axis alignment between the PM and PMF. When the transverse-electric (TE) axis of the PM 236 is aligned with the fast axis of the PMF 233, the total phase difference is determined by:

$$\varphi(\lambda) = \frac{2\pi}{\lambda}(B_{PMF} \cdot L_{PMF} + B_{PM} \cdot L_{PM}) \quad (2)$$

where $B_{PMF}$, $L_{PMF}$, $B_{PM}$ and $L_{PM}$ are the birefringence and length of the polarization maintaining fiber 233 and phase modulator 236, respectively. The aligned PM 236 and PMF 233 work as a tunable birefringence device. The transmission function can be determined by the birefringence and length of the PMF 233 and the PM 236. During tuning, all the parameters are kept constant except $B_{PM}$, which is tuned based on the electro-optic Pockels effect by applying different DC or AC voltages to the PM 236. Since the electro-optic Pockels effect has a fast response time, a tuning speed of tens of GHz can be achieved with the PM-LMF 215, and is mainly governed by the modulation bandwidth of the PM 236.

$$\Delta\lambda = \frac{\lambda^2}{B_{PMF} \cdot L_{PMF} + B_{PM} \cdot L_{PM}} \quad (3)$$

The free spectral range (FSR) of the PM-LMF 215 is determined by EQN. (3), which also represents the FSR of the tunable MWP notch filter 200. In one embodiment of FIG. 2, a 10-GHz phase modulator 236 can be used as the tuning device, which can comprise a 71-mm LiNbO$_3$ crystal with birefringence of $7.4 \times 10^{-3}$ and 1-m of PMF pigtails with birefringence of $3.0 \times 10^{-4}$. By combining a piece of 37.5-m PMF 233 with birefringence of $6.6 \times 10^{-4}$, a MWP notch filter 200 with a FSR of 10-GHz can be achieved. The FSR can be adjusted to meet specific application requirements by changing the length of the PMF 233, e.g., a longer piece of PMF 233 results in a MWP filter with smaller FSR.

Microwave photonic switch

An ultra high-speed MWP RF switch can be achieved using a fast tunable MWP notch filter 200. The input RF signal can include two RF signals at different frequencies. Depending on the control signal, only one of the signals in the input RF signal 203 may be allowed to pass through at a time, resulting in switching between the two RF signals in the input RF signal 203. Operation principle of the MWP RF switch is illustrated in FIG. 3, where the sinusoidal signals 203a and 203b represent two RF signals at different frequencies ($f_1$ and $f_2$, respectively), and the square wave with two voltage levels ($V_1$ and $V_2$) represents the control signal 303 for switching out one of the input RF signal at a time. According to the applied voltage (e.g., the voltage level of the square wave) to the phase modulator 236 in the optical notch filter (PM-LMF) 200 of FIG. 2, the MWP notch filter 200 can be tuned to different spectral positions. The voltage levels $V_1$ and $V_2$ can be set such that the notch of the MWP RF notch filter 200 can be switched between frequencies $f_1$ and $f_2$. In this way, the notch position can be at $f_1$ when the voltage level is $V_1$, allowing the $f_2$ signal to pass through; while the notch position can be at $f_2$, when voltage level is $V_2$, allowing the $f_1$ signal to pass through.

In the example of FIG. 3, the square control signal 303 has a voltage level of $V_1$ during time slot $t_1$, and a voltage level of $V_2$ during time slot $t_2$. Two RF signals at frequencies at $f_1$ 203b and $f_2$ 203a are launched to the RF input of the MWP RF switch. The voltage levels of the square control signal 303 are set such that the MWP notch filter 200 is aligned with frequency $f_1$ when voltage level is at $V_1$, resulting in the blocking of the $f_1$ signal 203b and allowing the $f_2$ signal 203a to pass through; while the MWP notch filter 200 is aligned with $f_2$ when voltage level is at $V_2$, resulting in the blocking of the $f_2$ signal 203a and allowing the $f_1$ signal 203b to pass through. When the control signal is switching between $V_1$ and $V_2$, the output is also switching between $f_2$ signal 203a and $f_1$ signal 203b. As a result, the $f_1$ signal 203b is switched as the output during $t_2$ and $f_2$ signal 203a is switched as the output during $t_1$. The MWP RF switch can also serve as an ON/OFF switch if only one input RF signal 203 is provided, such that the input RF signal 203 will be blocked when the notch position is located at the signal frequency. The RF signal 203 passes through the MWP RF switch when the MWP notch filter 200 is tuned away from the signal frequency. Since the switching of MWP RF switch is based on birefringence change through the electro-optic Pockels effect in the phase modulator 233, the control signal 303 can be set to tens of GHz. The switching is governed by the modulation bandwidth of the PM 236. For example, a commercially available 40-GHz phase modulator may be used, corresponding to a response time of 25 ps.

Test results

Figure 4:
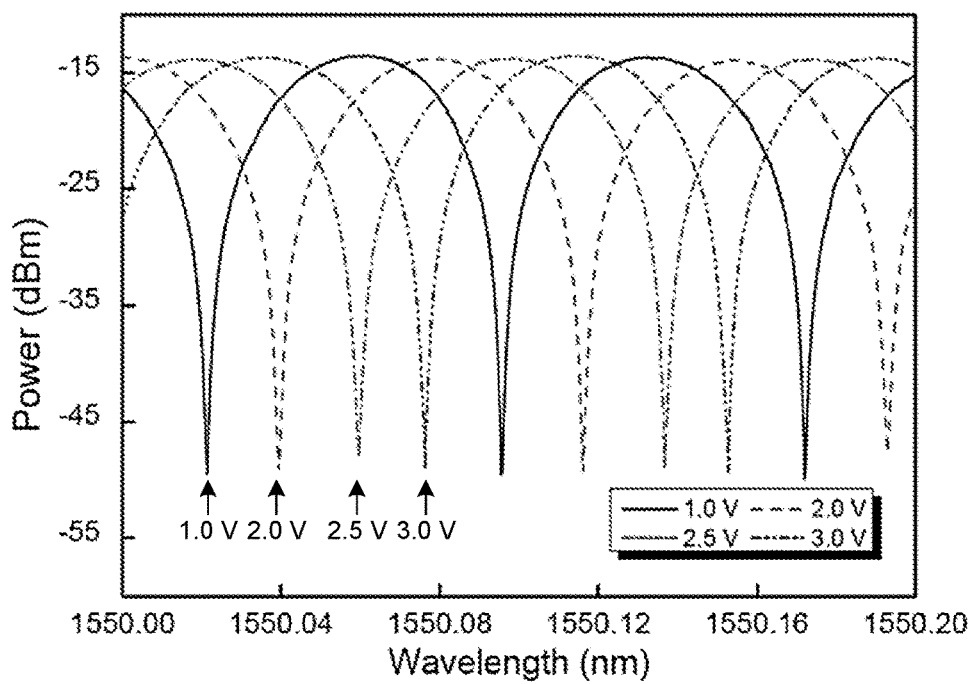
FIG. 4 is a plot of measured optical transmission spectra of a tunable phase modulator incorporated loop mirror filter (PM-LMF) of FIG. 2 at various tuning voltages in accordance with various embodiments of the present disclosure.

Referring now to FIG. 4, shown are the transmission optical spectra of the PM-LMF (optical notch filter) 215 at different tuning voltages. The transmission spectra were measured by an optical spectrum analyzer with a resolution of 0.8 pm. An optical comb filter with a FSR of 80 pm was observed. The peak-to-notch extinction ratios are over 35 dB, while both the spectral shape and extinction ratio remained unchanged during the entire tuning process. The PM-LMF 215 (FIG. 2) can be continuously tuned by applying different DC voltages to the PM 236, wavelength tuning over one FSR was observed at an applied voltage of 3.5 V and up to three FSR total tuning range was recorded at an applied voltage of 5.5 V. The change in comb spacing as a consequence of frequency tuning effect was less than 2 pm, thus its influence to MWP notch filter 200 (FIG. 2) and the MWP RF switch can be neglected.

Figure 5A:
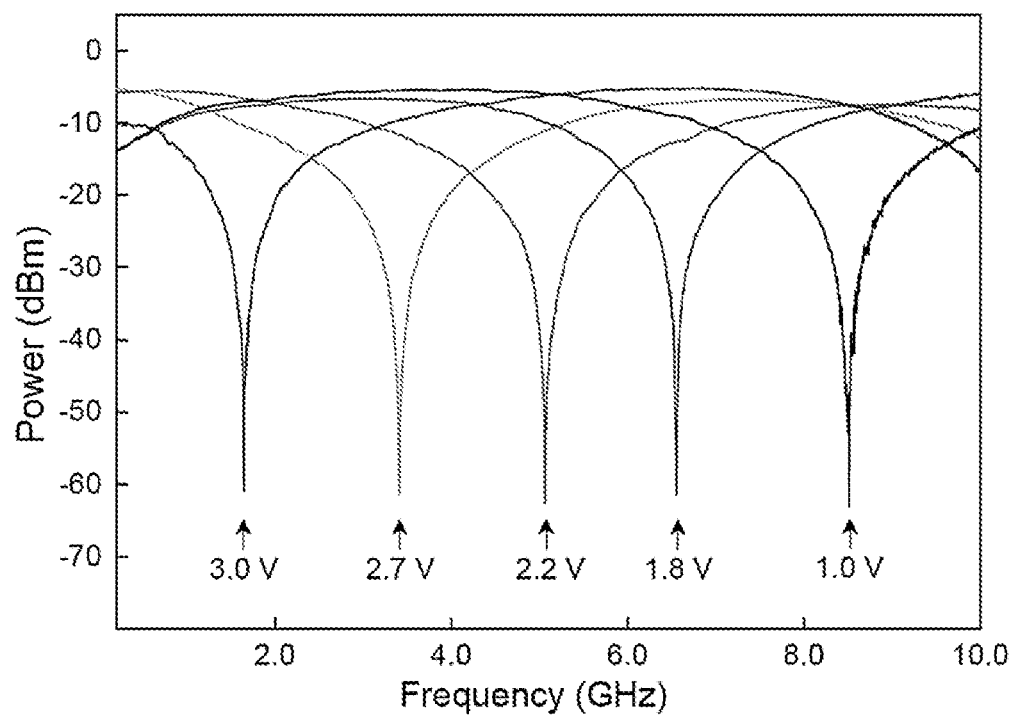
FIGS. 5A and 5B are plots illustrating measured frequency tuning spectra and notch frequency shift in response to various tuning voltages of the MWP notch filter of FIG. 2 in accordance with various embodiments of the present disclosure.
Figure 5B:
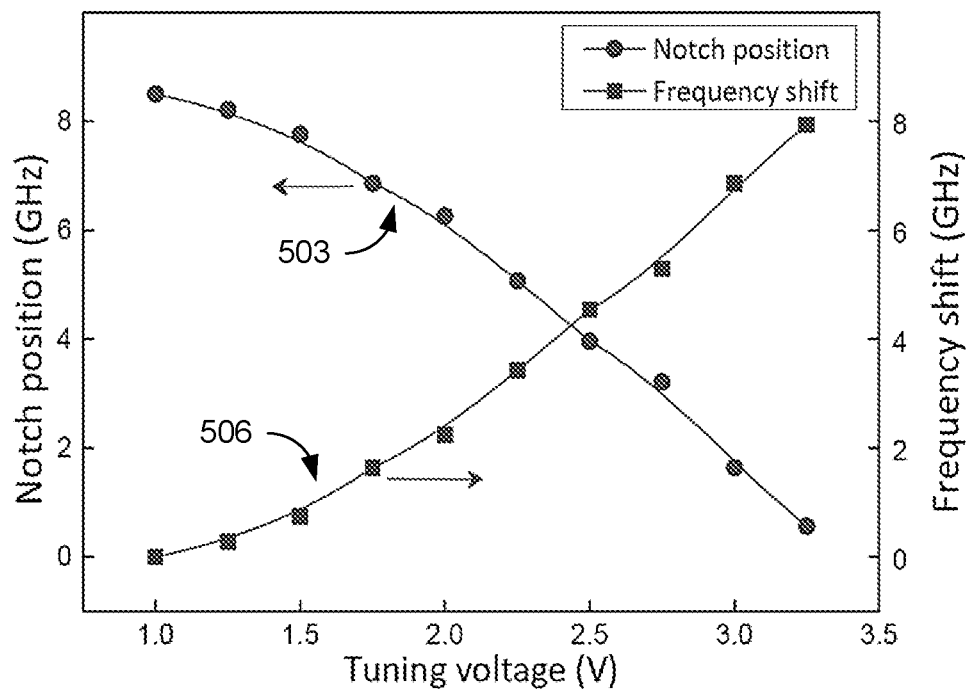

FIG. 5A shows the frequency tuning spectra of the MWP notch filter 200 at different voltages, measured by an electrical network analyzer 227 (FIG. 2) with an intermediate frequency bandwidth of 5 kHz. The RF filter notch position was continuously tuned from 1.5-GHz to 10-GHz with a 10-dB bandwidth of 1.7-GHz. The notch rejection ratios are over 50 dB, which provide good filter selectivity. Stable filter profiles and uniform notch rejection ratios were observed throughout the entire tuning range. The amount of notch frequency tuning in response to different tuning voltages is shown in FIG. 5B (solid square curve), where the notch frequency was tuned by 8-GHz at a tuning voltage of 3.3 V. The notch frequency tuning was not obvious when the applied voltage was under 1.0 V due to the insignificant change of birefringence in the phase modulator. The total tuning range was determined by how much the birefringence could be changed in the PM 236 (FIG. 2), and up to three FSR of total frequency tuning was achieved, corresponding to over 30-GHz. FIG. 5B illustrates the relationship between notch position 503 and frequency shift 506 in response to the tuning voltage.

Figure 6A:
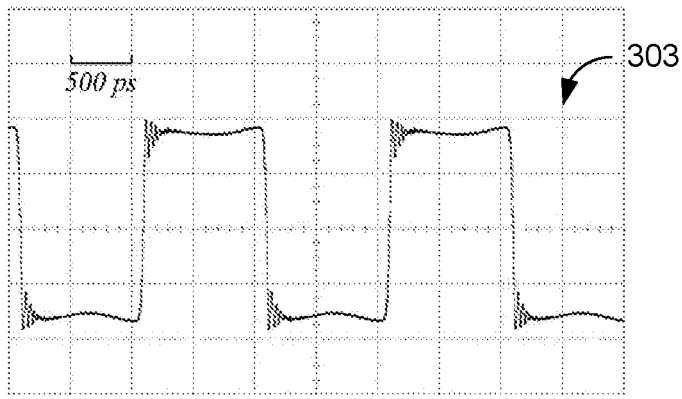
FIGS. 6A through 6D are plots illustrating measured ON/OFF switching performance of the MWP switch in accordance with various embodiments of the present disclosure.
Figure 6B:
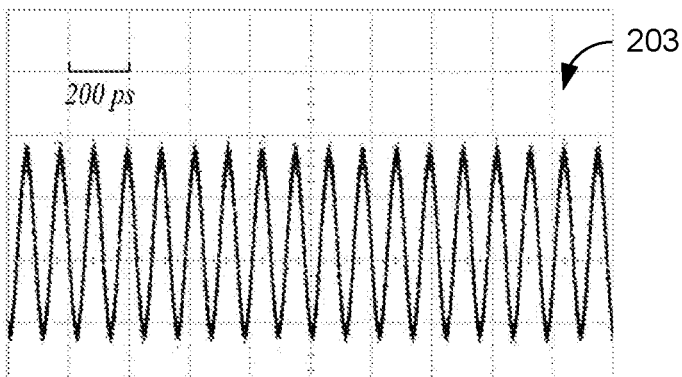
Figure 6C:
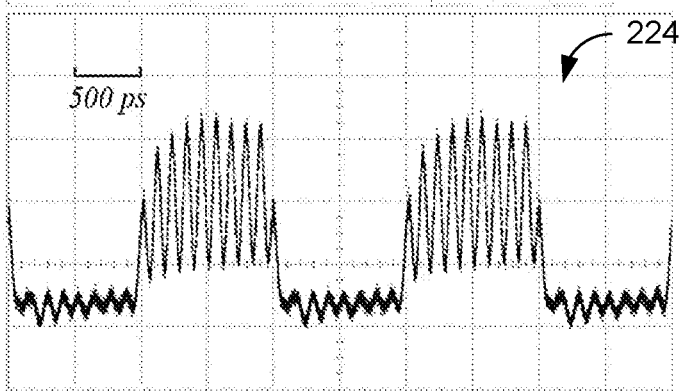
Figure 6D:
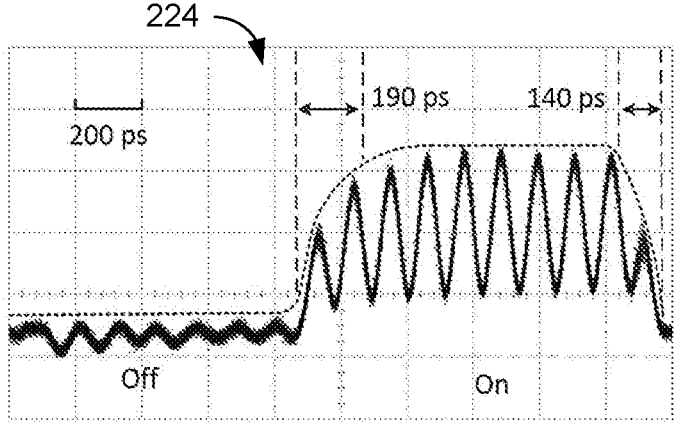

FIGS. 6A through 6D illustrate an example of the ON/OFF switching performance of a MWP RF switch, measured by a 30-GHz oscilloscope. A 0.5-GHz square wave was used as the control signal 303 and a 9-GHz sinusoidal signal was launched into the DDMZM as the input RF signal 203, as shown in FIGS. 6A and 6B, respectively. The MWP notch filter 200 was first aligned at 9-GHz when no control signal was applied, where the 9-GHz signal was blocked by the MWP notch filter 200. The peak voltage of the control signal 303 was set to 2.5 V such that the notch was tuned away from 9-GHz during the high voltage period of the square wave. This allowed the input RF signal 203 to completely pass through the MWP RF switch. As a result of applying the 0.5-GHz square control signal, the 9-GHz input signal 203 was turned ON and OFF periodically with an ON-state and OFF-state duration of 1000 ps, which resulted in the RF output signal 224 shown in FIG. 6C. A closer look of the switching performance is shown in FIG. 6D. As shown FIG. 6D, the 9-GHz input signal 203 was completely blocked during the "OFF state" and was recovered and well maintained during the "ON state."

The MWP RF switch had an ON-OFF transition time of about 140 ps and an OFF-ON transition time of about 190 ps, as shown by the dotted transition sections in FIG. 6D. Since the control signal 303 itself had a rising and falling time of 100 ps, it imposed a limit in measuring the switching speed of the MWP RF switch. A shorter switching time could be obtained if a control signal 303 with a shorter rising/falling time was used. Moreover, the switching time was measured by taking the temporal separation of the closest signal peak of a fully recovered sinusoidal signal and an OFF state of the MWP RF switch. Thus, the real response time should be shorter than the measured value due to the "sampling" effect of the sinusoidal nature of the input RF signal 203. The power fluctuation during the transition area may be attributed to the imperfect square profile of the control signal 303, which exhibited significant high frequency ripples around the rising and falling edges as shown in FIG. 6A.

To demonstrate the capability to switch between two frequency channels, a set of 6-GHz and 12-GHz sinusoidal signals were used as the input RF signal. The switching performance is shown in FIGS. 7A and 7B. The two frequency signals were combined and launched into the MWP RF switch as the input RF signal 203 through an RF input port. A 0.5-GHz square control signal was used as the control signal 303. The MWP notch filter 200 was aligned at 6-GHz when no control signal 303 was applied. As a result, the 6-GHz signal was blocked when the control signal 303 was at 0 V, allowing only the 12-GHz signal to pass through. The voltage level of the control signal 303 was set to 0 V and 2.8 V such that the MWP notch filter 200 was aligned at 6-GHz when the control signal 303 is at 0 V, and aligned at 12-GHz when the control signal 303 was at 2.8 V. FIG. 7A shows the output of the MWP RF switch switching between the 6-GHz and 12-GHz RF signals, when the 0.5-GHz square control signal 303 was applied.

As shown in FIG. 7A, the RF output signal 224 was a periodic signal switching between the 6-GHz and 12-GHz from the input RF signal 203. The RF signal 203 were well maintained as sinusoidal waveforms during the two switching states, as shown in the close up of FIG. 7B. Similar to the ON/OFF switch performance, the switching time between different channels were about 170 ps for switching from 12-GHz to 6-GHz, and about 80 ps for switching from 6-GHz to 12-GHz. These results show that a MWP RF switch is able to work at a tuning speed of tens of GHz with a switching transition time of less than a hundred picoseconds.

To investigate the frequency tuning speed of the MWP notch filter 200, a 9-GHz sinusoidal signal was launched into the DDMZM 209 as the input RF signal 203, as shown in FIG. 8A (with 200 ps/division). The MWP notch filter 200 was first aligned at 9-GHz when no control signal was applied, such that the 9-GHz signal was blocked by the MWP notch filter 200. 1-GHz and 4.5-GHz sinusoidal signals were used in two separate trials to tune the MWP notch filter 200, and corresponding RF output signals 224 were measured by a 30-GHz oscilloscope. The peak voltages of the control signal 303 were set to 2.5 V, with the control signal 303 changing from 0 to 2.5 V in a sinusoidal manner. When the control signal was between 0 to 1 V, the notch shift was insignificant (with MWP notch filter was blocking the 9-GHz input RF signal 203), resulting in the zero level in FIG. 8B (with 200 ps/division).

As the voltage of the control signal 303 increased from 1.0 V to 2.5 V, the frequency shift in the notch frequency was observed such that the notch was tuned far away from the 9-GHz signal when the voltage reached 2.5 V, allowing the 9-GHz input RF signal 203 to completely pass through. As a result, the 9-GHz input RF signal 203 started to show up in FIG. 8B and reached its peak value when the control signal 303 was at 2.5 V, as indicated by the sinusoidal envelope of the RF output signal 224. If a square wave was used as the control signal 303, the 9-GHz input RF signal 203 would be turned ON and OFF. A similar phenomenon was observed when a 4.5-GHz sinusoidal signal is used for tuning, such that every other cycle of the input signal is passed through the MWP notch filter 200, as shown in FIG. 8C (with 200 ps/division). The measurement results show that the MWP notch filter 200 is able to work at GHz tuning speeds with stable performance.

The above frequencies were chosen due to the synchronization needs of the equipment used for the experiment. In principle, any frequency within the modulation bandwidth of the DDMZM 209 and PM 236 can be used for real applications.

In summary, a MWP notch filter 200 (FIG. 2) with high-speed notch frequency tunability has been disclosed and experimentally demonstrated. The filter makes use of rapidly tunable optical sideband spectrum filtering, which can be achieved by the PM-LMF 215. The notch filter is continuously and rapidly tunable simply through the adjustment of the driving voltage (control signal 303) applied to the phase modulator (PM) 236 inside the PM-LMF 215. Up to gigahertz tuning speeds were experimentally obtained with stable performance. Uniform filter shape with over a 50 dB rejection ratio was also observed, and the filter characteristic was consistent throughout a frequency tuning range from about 1.5-GHz to about 10-GHz.

In addition, a MWP RF switch with a high switching speed and ultra-short ON/OFF transition time has been experimentally demonstrated. The high-speed MWP RF switch makes use of the fast tunable MWP notch filter 200 to block an unwanted channel, which can be achieved using the PM-LMF 215. As shown experimentally, both the RF ON/OFF switch and the two-channel switch can be operated at GHz rates with a switching time of about 100 picoseconds. This switch design can significantly improve the switching speed to a picosecond level, as well as provide stable and repeatable switching performance.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" includes traditional rounding according to significant figures of numerical values. In addition, the phrase "about 'x' to 'y'" includes "about 'x' to about 'y'".

Therefore, at least the following is claimed:

1. A radio frequency (RF) switch, comprising:
 a dual-drive Mach-Zehnder modulator (DDMZM) configured to generate a single-sideband (SSB) signal by modulating an input RF signal onto an optical carrier;
 a tunable phase modulator incorporated loop mirror filter (PM-LMF) configured to optically notch filter the SSB signal in response to a control signal, where the input RF signal comprises a signal at a predefined frequency, and the tunable PM-LMF is configured to turn on or off the signal at the predefined frequency in response to the control signal; and
 a photodetector (PD) configured to generate a RF output signal based upon the SSB signal.

2. The RF switch of claim 1, wherein the tunable PM-LMF turns on or off the signal at the predefined frequency based upon a voltage level of the control signal.

3. The RF switch of claim 1, wherein the tunable PM-LMF comprises a polarization maintaining fiber (PMF), a polarization controller (PC), and a phase modulator (PM) configured to control operation of the tunable PM-LMF based upon the control signal.

4. The RF switch of claim 3, wherein switching of the tunable PM-LMF is based upon a Pockels electro-optic effect produced in the PM in response to the control signal.

5. The RF switch of claim 1, wherein the input RF signal is modulated onto the optical carrier by the DDMZM via a 90-degree hybrid coupler.

6. The RF switch of claim 1, wherein the control signal comprises a switching period that is less than a nanosecond and a rise-time/fall-time of about 100 picoseconds or less.

7. A radio frequency (RF) switch, comprising:
 a dual-drive Mach-Zehnder modulator (DDMZM) configured to generate a single-sideband (SSB) signal by modulating an input RF signal onto an optical carrier;
 a tunable phase modulator incorporated loop mirror filter (PM-LMF) configured to optically notch filter the SSB signal in response to a control signal, where the input RF signal comprises a first signal at a first predefined frequency and a second signal at a second predefined frequency, and the tunable PM-LMF is configured to switch between the first signal and the second signal in response to the control signal; and
 a photodetector (PD) configured to generate a RF output signal based upon the SSB signal.

8. The RF switch of claim 7, wherein the control signal comprises a switching period that is less than a nanosecond and a rise-time/fall-time of about 100 picoseconds or less.

9. The RF switch of claim 8, wherein a switching speed of the RF switch is less than 200 picoseconds.

10. The RF switch of claim 9, wherein the switching speed is less than 100 picoseconds.

11. The RF switch of claim 7, wherein the tunable PM-LMF switches between the first signal and the second signal based upon a voltage level of the control signal.

12. The RF switch of claim 7, wherein the SSB signal is launched into the tunable PM-LMF via an optical coupler.

13. The RF switch of claim 12, comprising an optical amplifier configured to amplify the SSB signal prior to launching into the tunable PM-LMF.

14. A method, comprising:
modulating an input radio frequency (RF) signal onto an optical carrier to generate a single-sideband (SSB) signal;
notch filtering the SSB signal by a tunable phase modulator incorporated loop mirror filter (PM-LMF) in response to a control signal, wherein the tunable PM-LMF switches between notch filtering at a first frequency and notch filtering at a second frequency in response to the control signal; and
generating a RF output signal based upon the SSB signal.

15. The method of claim 14, wherein the tunable PM-LMF switches the RF output signal between the first frequency and the second frequency in response to the control signal.

16. The method of claim 15, wherein the input RF signal comprises a signal at the first frequency and no signal at the second frequency.

17. The method of claim 14, wherein the notch filtering of the SSB signal is based upon birefringence in a phase modulator (PM) of the tunable PM-LMF and a polarization maintaining fiber (PMF).

18. The method of claim 17, wherein tuning of the notch filtering is based upon an electro-optic Pockels effect produced in the PM in response to the control signal.

19. The method of claim 14, wherein the control signal comprises a switching period that is less than a nanosecond and a rise-time/fall-time of about 100 picoseconds or less.

20. The RF switch of claim 7, wherein the tunable PM-LMF comprises a phase modulator (PM) configured to control operation of the tunable PM-LMF based upon the control signal, and switching of the tunable PM-LMF is based upon a Pockels electro-optic effect produced in the PM in response to the control signal.

* * * * *